US012755424B2

(12) United States Patent
Tee et al.

(10) Patent No.: US 12,755,424 B2
(45) Date of Patent: Oct. 6, 2026

(54) POSTURE COMPARISON METHOD, ELECTRONIC DEVICE, AND COMPUTER-READABLE STORAGE MEDIUM

(71) Applicant: BOMDIC INC., New Taipei City (TW)

(72) Inventors: Leong Kian Tee, New Taipei City (TW); Yan-Ru Wang, New Taipei City (TW)

(73) Assignee: BOMDIC INC., New Taipei City (TW)

( * ) Notice: Subject to any disclaimer, the term of this patent is extended or adjusted under 35 U.S.C. 154(b) by 224 days.

(21) Appl. No.: 18/749,561

(22) Filed: Jun. 20, 2024

(65) Prior Publication Data

US 2025/0005792 A1 Jan. 2, 2025

(30) Foreign Application Priority Data

Jun. 29, 2023 (CN) ......................... 202310783234.7
Jun. 29, 2023 (CN) ......................... 202310784631.6

(51) Int. Cl.
*G06T 7/73* (2017.01)
*G06V 10/75* (2022.01)
*G06V 20/40* (2022.01)

(52) U.S. Cl.
CPC .............. *G06T 7/74* (2017.01); *G06V 10/751* (2022.01); *G06V 20/48* (2022.01); *G06T 2207/20224* (2013.01)

(58) Field of Classification Search
CPC . G06T 7/74; G06T 7/246; G06T 2207/10016; G06T 2207/20224;
(Continued)

(56) References Cited

U.S. PATENT DOCUMENTS 8,023,726 B2 * 9/2011 Sundaresan ............ G06V 40/23 345/604
8,903,177 B2 * 12/2014 Livet .................... G06V 10/751 348/169

(Continued)

OTHER PUBLICATIONS

Shen et al., Publication Date—Oct. 16, 2022, "Design of OpenPose-Based of Exercise Assistant System with Instructor-User Synchronization for Self-Practice Dynamic Yoga" (pp. 246-251). (Year: 2022).*

(Continued)

*Primary Examiner* — Manav Seth
(74) *Attorney, Agent, or Firm* — Meunier Carlin & Curfman LLC

(57) ABSTRACT

A posture comparison method, an electronic device, and a computer-readable storage medium are provided. The method includes: obtaining M first image frames of a first video stream within a specific time interval, and obtaining N second image frames of a second video stream within the specific time interval; determining K first joint points corresponding to K specified joints in each first image frame, and determining K second joint points corresponding to the K specified joints in each second image frame; obtaining an m-th first image frame among the M first image frames and an n-th second image frame among the N second image frames; and determining a difference between each first joint point and each corresponding second joint point in the m-th first image frame and the n-th second image frame, and determining a posture difference degree and providing a posture correction recommendation corresponding to the specific time interval accordingly.

20 Claims, 9 Drawing Sheets

(58) Field of Classification Search
CPC ........ G06T 2207/30196; G06V 10/751; G06V 20/46; G06V 20/48
See application file for complete search history.

(56) References Cited

U.S. PATENT DOCUMENTS

| | | | | |
|---|---|---|---|---|
| 11,475,590 | B2 * | 10/2022 | Kadav | G06T 7/74 |
| 11,944,870 | B2 * | 4/2024 | Tee | A63B 24/0062 |
| 2019/0065900 | A1 * | 2/2019 | Nishino | G06T 7/246 |
| 2021/0082128 | A1 * | 3/2021 | Okada | G06T 7/248 |
| 2025/0131689 | A1 * | 4/2025 | Kawai | G06V 40/103 |
| 2026/0073606 | A1 * | 3/2026 | Li | G06T 13/40 |

OTHER PUBLICATIONS

Kanase et al., 2021, "Pose Estimation and Correcting Exercise Posture" (pp. 1-6). (Year: 2021).*

Zhao et al., 2022, "Research on the application of body posture action feature extraction and recognition comparison" (pp. 104-117) (Year: 2022).*

Liu et al., 2019, "Human use similar posture sequences in a whole-body tracing task" (25 pages). (Year: 2019).*

Krishna, 2020, Human pose comparison and action scoring using deep learning, OpenCV & Python (18 pages) (Year: 2020).*

* cited by examiner

POSTURE COMPARISON METHOD, ELECTRONIC DEVICE, AND COMPUTER-READABLE STORAGE MEDIUM

CROSS-REFERENCE TO RELATED APPLICATION

This application claims the priority benefit of China application serial no. 202310783234.7, filed on Jun. 29, 2023 and China application serial no. 202310784631.6, filed on Jun. 29, 2023. The entirety of each of the above-mentioned patent applications is hereby incorporated by reference herein and made a part of this specification.

BACKGROUND

Technical Field

The disclosure relates to an image analysis technology, and in particular to a posture comparison method, an electronic device, and a computer-readable storage medium.

Description of Related Art

In modern life, learning exercises through various exercise teaching videos has become a very common way of learning. However, for the general public, it is difficult to objectively judge whether the actions they are doing are consistent with the demonstration actions presented in the exercise teaching videos.

SUMMARY

Embodiments of the disclosure provide a posture comparison method, an electronic device, and a computer-readable storage medium, which can be used to solve the above technical issues.

An embodiment of the disclosure provides a posture comparison method, which is applicable to an electronic device and includes the following steps. M first image frames of a first video stream within a specific time interval are obtained, and N second image frames of a second video stream within the specific time interval are obtained, where M and N are positive integers. K first joint points corresponding to K specified joints are determined in each of the first image frames, and K second joint points corresponding to the K specified joints are determined in each of the second image frames. The K first joint points respectively correspond to the K second joint points, and K is a positive integer. An m-th first image frame among the M first image frames and an n-th second image frame among the N second image frames are obtained, where 1≤m≤M and 1≤n≤N. A difference between each of the first joint points and each of the corresponding second joint points in the m-th first image frame and the n-th second image frame is determined, and a posture difference degree corresponding to the specific time interval difference is determined accordingly. In another embodiment, a posture correction recommendation corresponding to the specific time interval difference is provided accordingly also.

An embodiment of the disclosure provides an electronic device, which includes a storage circuit and a processor. The storage circuit stores a program code. The processor is coupled to the storage circuit, accesses the program code and executes the following steps. M first image frames of a first video stream within a specific time interval are obtained, and N second image frames of a second video stream within the specific time interval are obtained, where M and N are positive integers. K first joint points corresponding to K specified joints are determined in each of the first image frames, and K second joint points corresponding to the K specified joints are determined in each of the second image frames. The K first joint points respectively correspond to the K second joint points, and K is a positive integer. An m-th first image frame among the M first image frames and an n-th second image frame among the N second image frames are obtained, where 1≤m≤M and 1≤n≤N. A difference between each of the first joint points and each of the corresponding second joint points in the m-th first image frame and the n-th second image frame is determined, and a posture difference degree corresponding to the specific time interval difference is determined accordingly. In another embodiment, a posture correction recommendation corresponding to the specific time interval difference is provided accordingly also.

An embodiment of the disclosure provides a computer-readable storage medium, which records an executable computer program. The executable computer program is loaded by a posture comparison device to execute the following steps. M first image frames of a first video stream within a specific time interval are obtained, and N second image frames of a second video stream within the specific time interval are obtained, where M and N are positive integers. K first joint points corresponding to K specified joints are determined in each of the first image frames, and K second joint points corresponding to the K specified joints are determined in each of the second image frames. The K first joint points respectively correspond to the K second joint points, and K is a positive integer. An m-th first image frame among the M first image frames and an n-th second image frame among the N second image frames are obtained, where 1≤m≤M and 1≤n≤N. A difference between each of the first joint points and each of the corresponding second joint points in the m-th first image frame and the n-th second image frame is determined, and a posture difference degree corresponding to the specific time interval difference is determined accordingly. In another embodiment, a posture correction recommendation corresponding to the specific time interval difference is provided accordingly also.

BRIEF DESCRIPTION OF THE DRAWINGS

The drawings are included to provide a further understanding of the disclosure, and the drawings are incorporated into the specification and constitute a part of the specification. The drawings illustrate embodiments of the disclosure and serve to explain principles of the disclosure together with the description.

DESCRIPTION OF THE EMBODIMENTS

Figure 1:
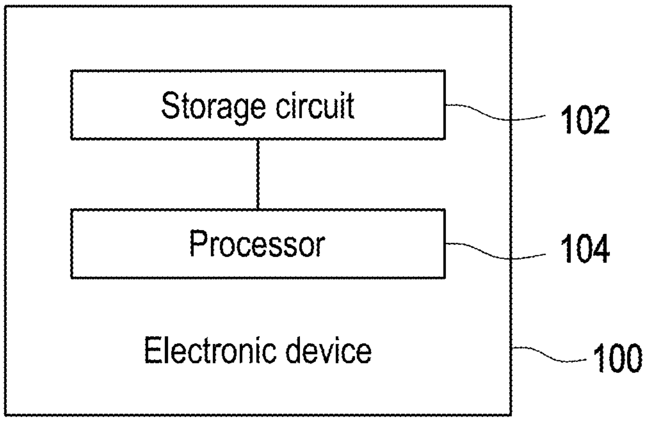
FIG. 1 is a schematic diagram of an electronic device according to an embodiment of the disclosure.

Reference will now be made in detail to the exemplary embodiments of the disclosure, examples of which are illustrated in the drawings. Wherever possible, the same reference numerals are used in the drawings and the description to refer to the same or similar parts.

Please refer to FIG. 1, which is a schematic diagram of an electronic device according to an embodiment of the disclosure. In different embodiments, an electronic device 100 may be implemented as various smart devices and/or computer devices, but not limited thereto.

In FIG. 1, the electronic device 100 includes a storage circuit 102 and a processor 104. The storage circuit 102 is, for example, any type of fixed or removable random-access memory (RAM), read-only memory (ROM), flash memory, hard disk, other similar devices, or a combination of the devices, and may be used to record multiple program codes or modules.

The processor 104 is coupled to the storage circuit 102 and may be a general purpose processor, a special purpose processor, a conventional processor, a digital signal processor, multiple microprocessors, one or more microprocessors combined with a digital signal processor core, a controller, a microcontroller, an application specific integrated circuit (ASIC), a field programmable gate array (FPGA), any other type of integrated circuits, a state machine, a processor based on an advanced reduced instruction set computer (RISC) machine (ARM), and the like.

In the embodiment of the disclosure, the processor 104 may access the modules and the program codes recorded in the storage circuit 102 to implement the methods (for example, a posture comparison method in a first embodiment and a posture recommendation method in a second embodiment) provided in the disclosure, and the details thereof are described below.

Figure 2:
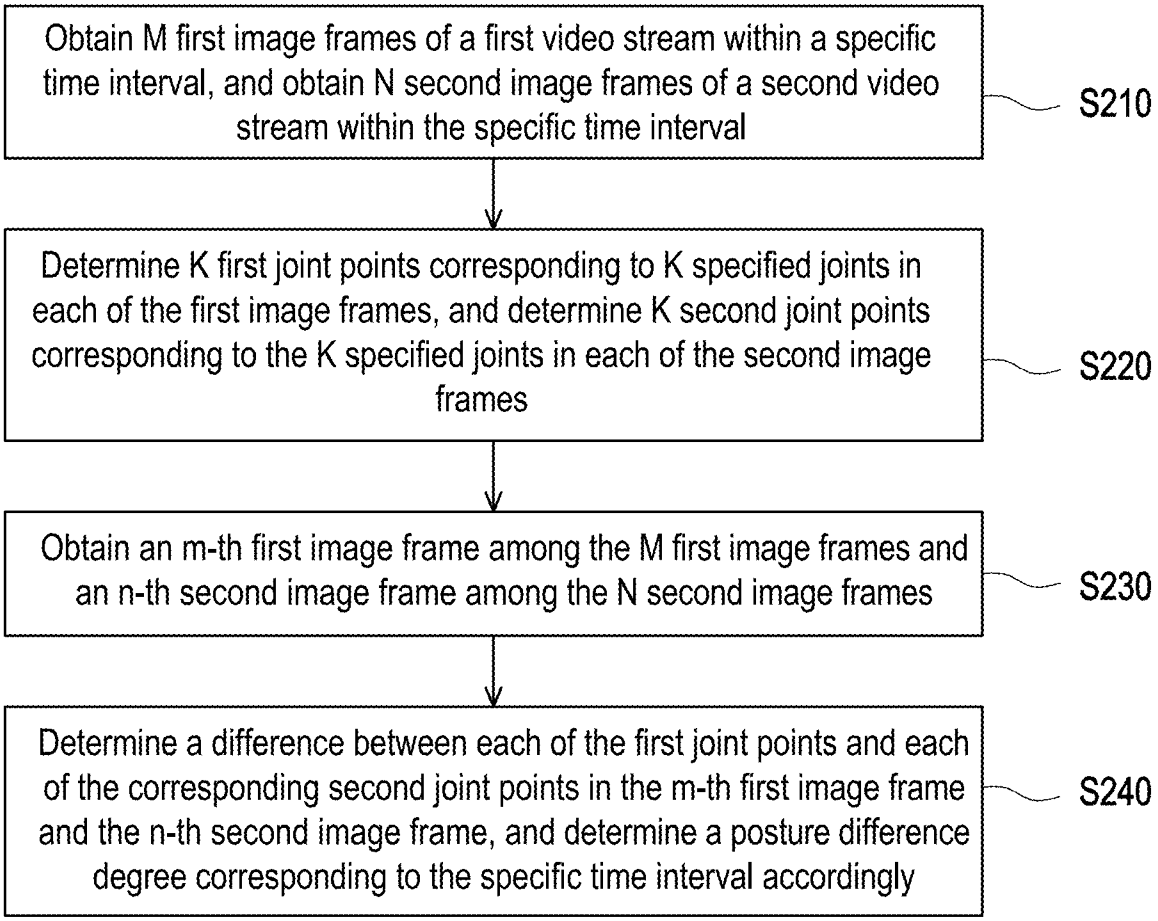
FIG. 2 is a flowchart of a posture comparison method according to a first embodiment of the disclosure.

Please refer to FIG. 2, which is a flowchart of a posture comparison method according to a first embodiment of the disclosure. The method of this embodiment may be executed by the electronic device 100 of FIG. 1, and the details of each step in FIG. 2 will be described below with the components shown in FIG. 1.

First, in Step S210, the processor 104 obtains M first image frames of a first video stream within a specific time interval (hereinafter referred to as T), and obtains N second image frames of a second video stream within the specific time interval T, where M and N are positive integers.

Figure 3:
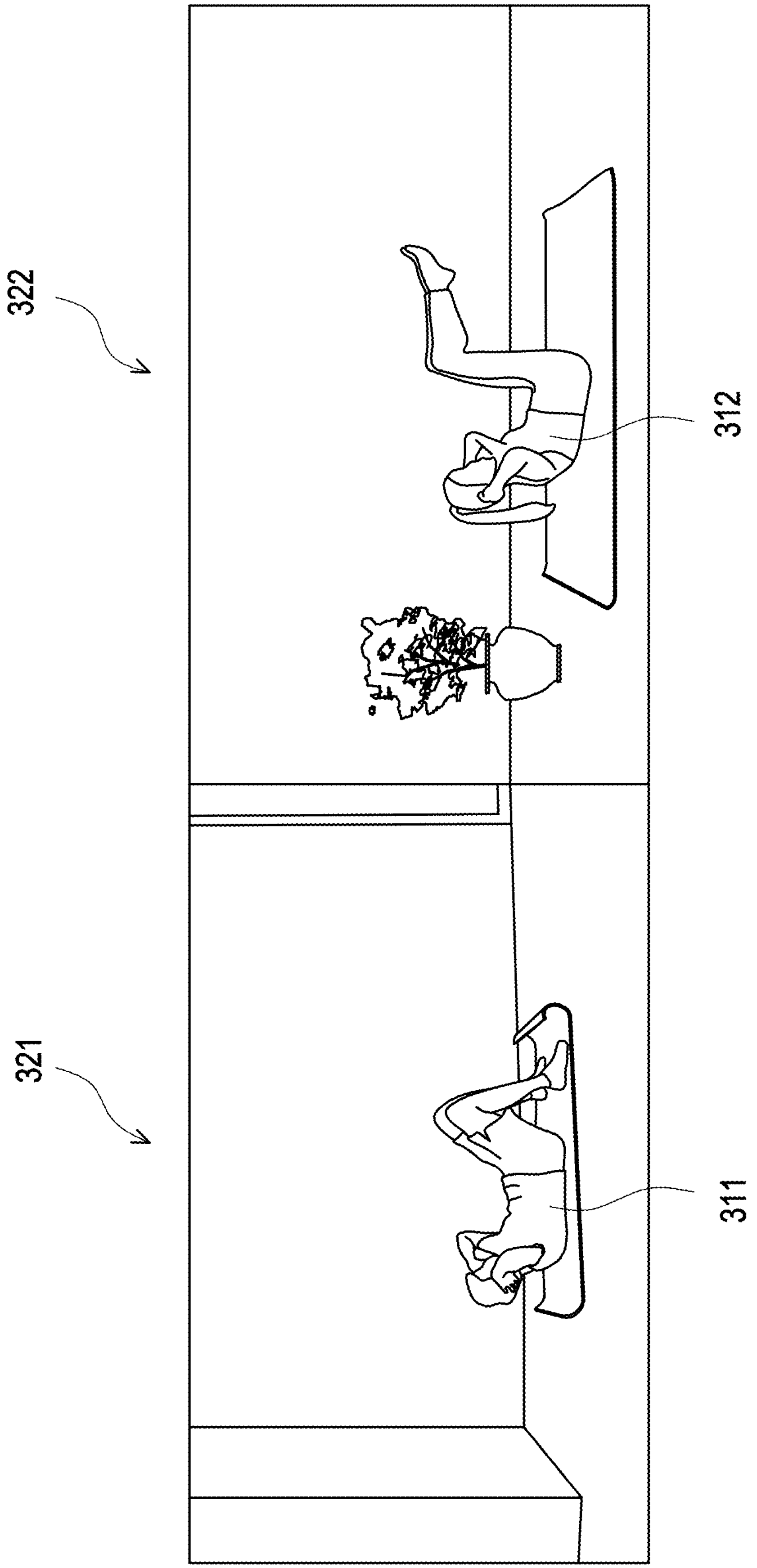
FIG. 3 is a schematic diagram of a first image frame and a second image frame according to an embodiment of the disclosure.

Please refer to FIG. 3, which is a schematic diagram of a first image frame and a second image frame according to an embodiment of the disclosure. In FIG. 3, the first video stream is a video of a first user 311 executing a specific action, the second video stream is a video of a second user 312 executing a specific action, the first image frame 321 is, for example, one of the M first image frames, and the second image frame 322 is, for example, one of the N second image frames.

In this embodiment, the second user 312 is, for example, an action demonstrator, such as a coach, and the second video stream is, for example, a video in which the second user 312 demonstrates the specific action (for example, sit-ups). In addition, the first user 311 is, for example, a person such as a student who executes the specific action with reference to the second video stream. In an embodiment, when the first user 311 watches the second video stream and imitates the second user 312 to execute the specific action, the relevant process may be recorded as the first video stream by a camera or other imaging device, and provided to the electronic device 100.

In an embodiment, the camera or the imaging device may be built in the electronic device 100 or externally connected to the electronic device 100 by wire or wirelessly. In an embodiment, the first video stream and/or the second video stream of the electronic device 100 may be captured in real time or obtained by the electronic device 100 from a relevant storage device, but not limited thereto.

In an embodiment, M may be determined according to the frame rate of the first video stream and the length of the considered specific time interval T. For example, assuming that the frame rate of the first video stream is 30 frames per second, and the length of the specific time interval T is 1 second, then M is, for example, 30 (that is, 30*1). For another example, assuming that the frame rate of the first video stream is 30 frames per second, and the length of the specific time interval T is 1.5 seconds, then M is, for example, 45 (that is, 30*1.5).

Similarly, N may be determined according to the frame rate of the second video stream and the length of the considered specific time interval T. For example, assuming that the frame rate of the second video stream is 25 frames per second, and the length of the specific time interval T is 1 second, then N is, for example, 25 (that is, 25*1). For another example, assuming that the frame rate of the second video stream is 25 frames per second, and the length of the specific time interval T is 2 seconds, then N is, for example, 25 (that is, 25*2).

In an embodiment, the specific time interval T may be determined by the designer according to requirements and may be used as a time unit for the electronic device 100 to determine a posture difference degree between the first user 311 and the second user 312 executing the specific action.

For example, assuming that the specific time interval T is set to be from an A-th second to a B-th second (that is, the length of the specific time interval T is (B−A) seconds), then the processor 104 may obtain the image frames corresponding to the A-th second to the B-th second from the first video stream as the M first image frames, and obtain the image frames corresponding to the A-th second to the B-th second from the second stream as the N second image frames in Step S210, but not limited thereto.

In Step S220, the processor 104 determines K first joint points corresponding to K specified joints in each first image frame, and determines K second joint points corresponding to the K specified joints in each second image frame, where K is a positive integer.

In an embodiment, the K specified joints are, for example, K joints of interest that may be used to determine the posture difference degree between the first user 311 and the second user 312. In the embodiment of FIG. 3 in which the specific action is assumed to be sit-ups, the processor 104 may regard K joints that are more relevant to executing sit-ups, such as shoulder joints, hip joints, knee joints, and ankle joints, as the joints of interest. In this case, joints that are not helpful for determining sit-ups, such as joints on the face and finger joints, may not be regarded as the joints of interest.

In an embodiment, the number of K, such as 21, may be determined by the designer according to requirements and the considered specific action, but not limited thereto. In another embodiment, the processor 104 judges the same K joints for different specific actions.

In an embodiment, after obtaining the M first image frames, the processor 104 may execute a relevant joint point recognition algorithm (for example, DeepPose) on each first image frame to determine the position of each body joint of the first user 311 in each first image frame, and then find joints corresponding to the K specified joints from the body joints in each first image frame as the K first joint points.

Similarly, after obtaining the N second image frames, the processor 104 may execute a relevant joint point recognition algorithm (for example, DeepPose) on each second image frame to determine the position of each body joint of the second user 312 in each second image frame, and then find joints corresponding to the K specified joints from the body joints in each second image frame as the K second joint points, but not limited thereto.

In an embodiment of the disclosure, the K first joint points correspond to the K second joint points one-to-one. In this case, the first and second joint points corresponding to each other all correspond to the same specified joint. For example, assuming that an i-th first joint point among the K first joint points corresponds to a knee joint, then an i-th second joint point among the K second joint points also corresponds to the knee joint. For another example, assuming that a j-th first joint point among the K first joint points corresponds to a hip joint, then a j-th second joint point among the K second joint points also corresponds to the hip joint, but not limited thereto (where i and j are index values).

Afterwards, in Step S230, the processor 104 obtains an m-th first image frame among the M first image frames and an n-th second image frame among the N second image frames, where 1≤m≤M and 1≤n≤N.

Next, in Step S240, the processor 104 determines the difference between each first joint point and each corresponding second joint point in the m-th first image frame and the n-th second image frame, and determines the posture difference degree corresponding to the specific time interval T accordingly.

Figure 4:
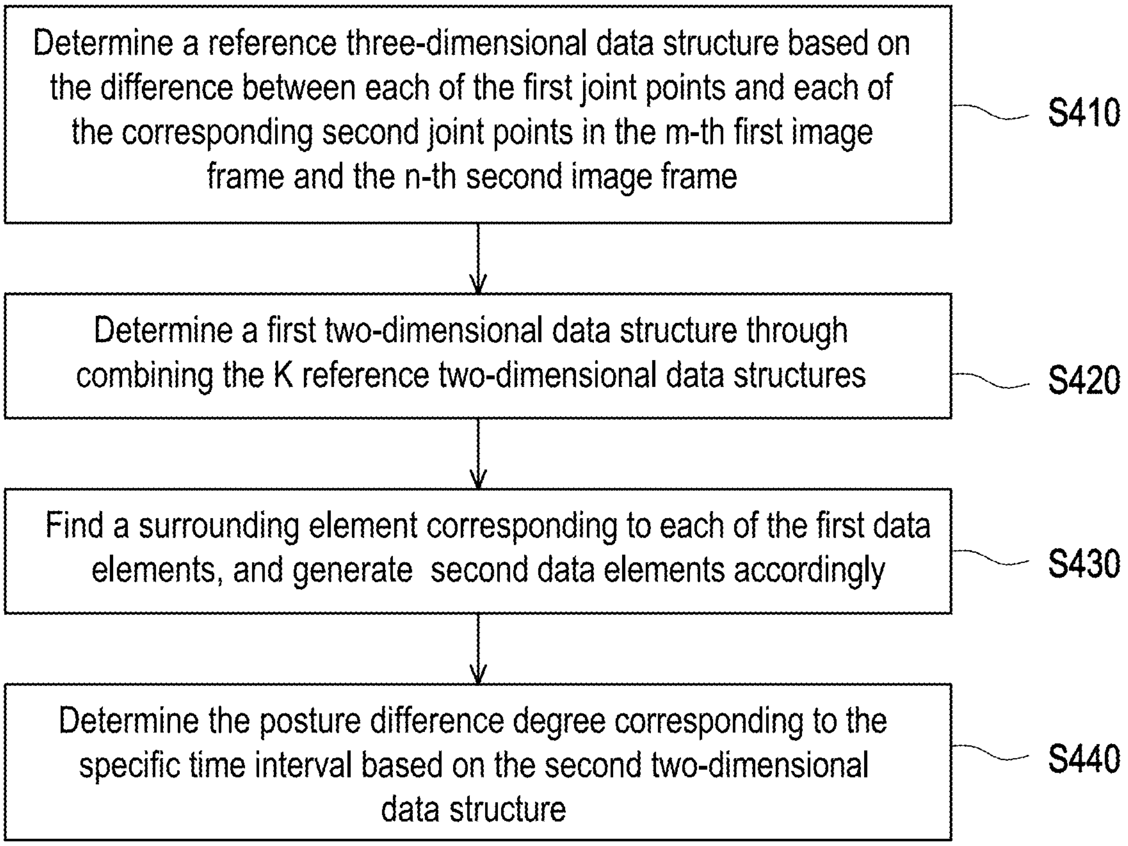
FIG. 4 is a flowchart of determining a posture difference degree corresponding to a specific time interval T according to the first embodiment of the disclosure.
Figure 5:
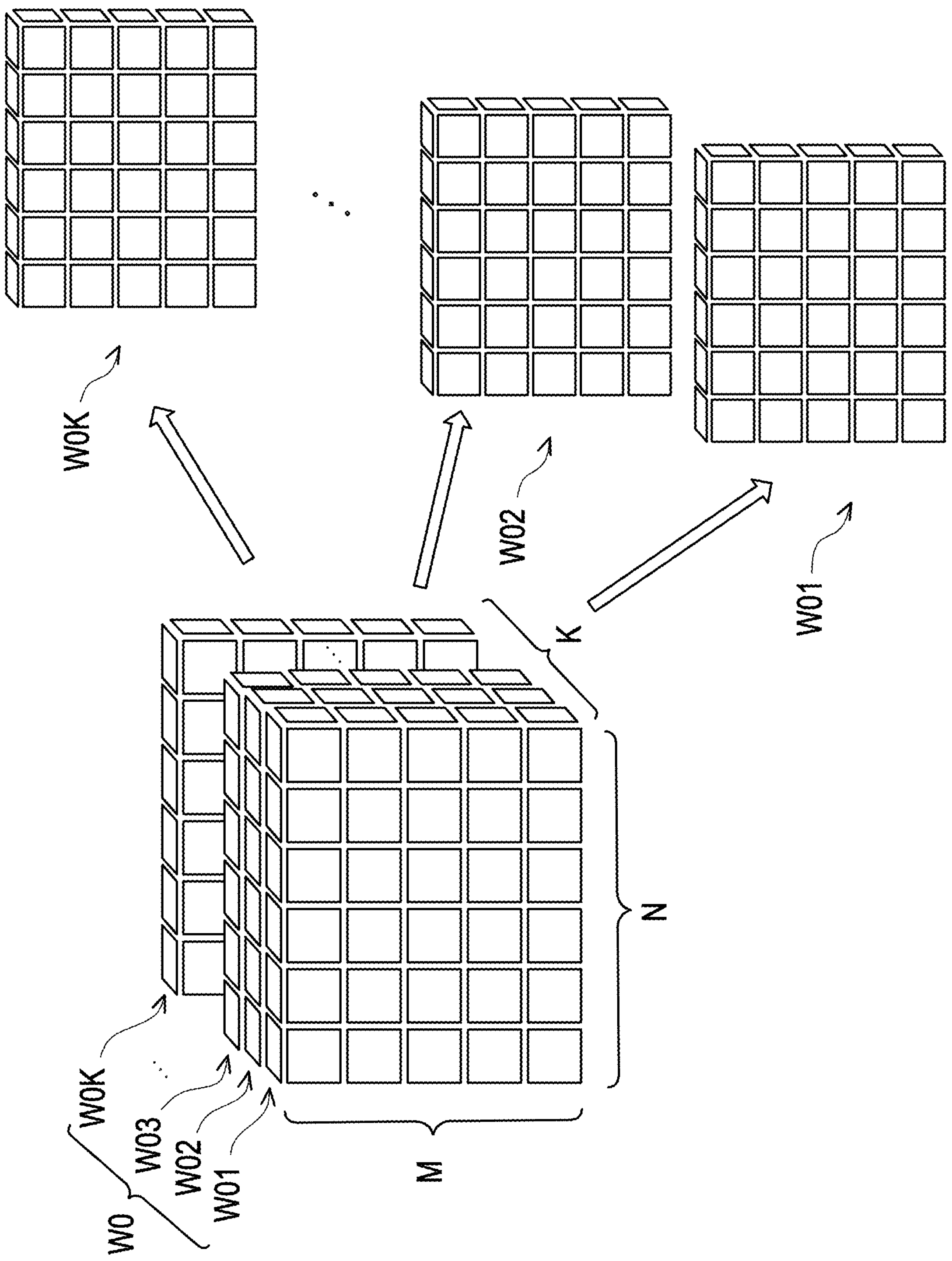
FIG. 5 is a schematic diagram of a reference three-dimensional data structure according to the first embodiment of the disclosure.

In the first embodiment, the details of Step S240 will be illustrated with reference to FIGS. 4 and 5, wherein FIG. 4 is a flowchart of determining a posture difference degree corresponding to a specific time interval T according to the first embodiment of the disclosure, and FIG. 5 is a schematic diagram of a reference three-dimensional data structure according to the first embodiment of the disclosure.

In Step S410, the processor 104 determines a reference three-dimensional data structure W0 based on the difference between each first joint point and each corresponding second joint point in the m-th first image frame and the n-th second image frame, wherein the reference three-dimensional data structure W0 has M×N×K reference data elements.

During the process of executing Step S410, the processor 104 may first initialize the reference three-dimensional data structure W0. For example, the processor 104 may establish a data array with a dimension of M×N×K as the initialized reference three-dimensional data structure W0.

Afterwards, the processor 104 may obtain a k-th first joint point among the K first joint points in the m-th first image frame as a first reference joint point, and obtain a k-th second joint point among the K second joint points in the n-th second image frame as a second reference joint point, where 1≤k≤K. Afterwards, the processor 104 may determine a position difference between the first reference joint point and the second reference joint point, and set a specific data element in the reference three-dimensional data structure W0 accordingly, wherein the specific data element corresponds to the m-th first image frame, the n-th second image frame, and a k-th specified joint among the K specified joints.

In the first embodiment, the position of the specific data element in the reference three-dimensional data structure W0 is, for example, (m, n, k), and the specific data element may be correspondingly expressed as W0(m, n, k), but not limited thereto.

In an embodiment, when determining the position difference between the first reference joint point and the second reference joint point, the processor 104 may be configured to: obtain first pixel coordinates of the first reference joint point in the m-th first image frame; obtain second pixel coordinates of the second reference joint point in the n-th second image frame; and determine the position difference between the first reference joint point and the second joint point based on a distance between the first pixel coordinates and the second pixel coordinates.

For example, it is assumed that the k-th specified joint (which corresponds to the k-th first joint point and the k-th second joint point) is a knee joint, and the m-th first image frame and the n-th second image frame are respectively the first image frame 321 and the second image frame 322 in FIG. 3. In this case, the processor 104 may find the knee joint of the first user 311 in the first image frame 321 as the first reference joint point, and find the knee joint of the second user 312 in the second image frame 322 as the second reference joint point. Afterwards, the processor 104 may determine that pixel coordinates of the knee joint of the first user 311 in the first image frame 321 are the first pixel coordinates, and determine that pixel coordinates of the knee joint of the second user 312 in the second image frame 322 are the second pixel coordinates. After that, the processor 104 may determine the position difference between the first reference joint point and the second reference joint point based on the distance between the first pixel coordinates and the second pixel coordinates.

In some embodiments, the processor 104 may, for example, determine the (normalized) Euclidean distance between the first reference joint point and the second reference joint point as the position difference, but not limited thereto.

After obtaining the position difference, the processor 104 may set the content of the reference data element (that is, W0(m, n, k)) at the position (m, n, k) in the reference three-dimensional data structure W0 as the position difference (for example, the (normalized) Euclidean distance between the first reference joint point and the second reference joint point), but not limited thereto.

In the embodiment of the disclosure, the processor 104 may determine the content of each reference data element in the reference three-dimensional data structure W0 based on the above mechanism.

In FIG. 5, the reference three-dimensional data structure W0 includes K reference two-dimensional data structures W01 to W0K, which respectively correspond to the K specified joints. For example, the reference two-dimensional data structure W01 corresponds to a 1-st specified joint among the K specified joints, the reference two-dimensional data structure W02 corresponds to a 2-nd specified joint among the K specified joints, and the reference two-dimensional data structure W0K corresponds to a K-th specified joint among the K specified joints.

In Step S420, the processor 104 determines a first two-dimensional data structure W1 through combining the K reference two-dimensional data structures, wherein the first two-dimensional data structure W1 has M×N first data elements.

During the process of determining the first two-dimensional data structure W1, the processor 104 may first initialize the first two-dimensional data structure W1. For example, the processor 104 may first establish a data array with a dimension of M×N as the initialized first two-dimensional data structure W1, but not limited thereto. After that, the processor 104 may find the reference data elements corresponding to the m-th first image frame and the n-th second image frame in each of the reference two-dimensional data structures W01 to W0K, and determine the first data element corresponding to the m-th first image frame and the n-th second image frame in the first two-dimensional data structure W1 accordingly.

Figure 6:
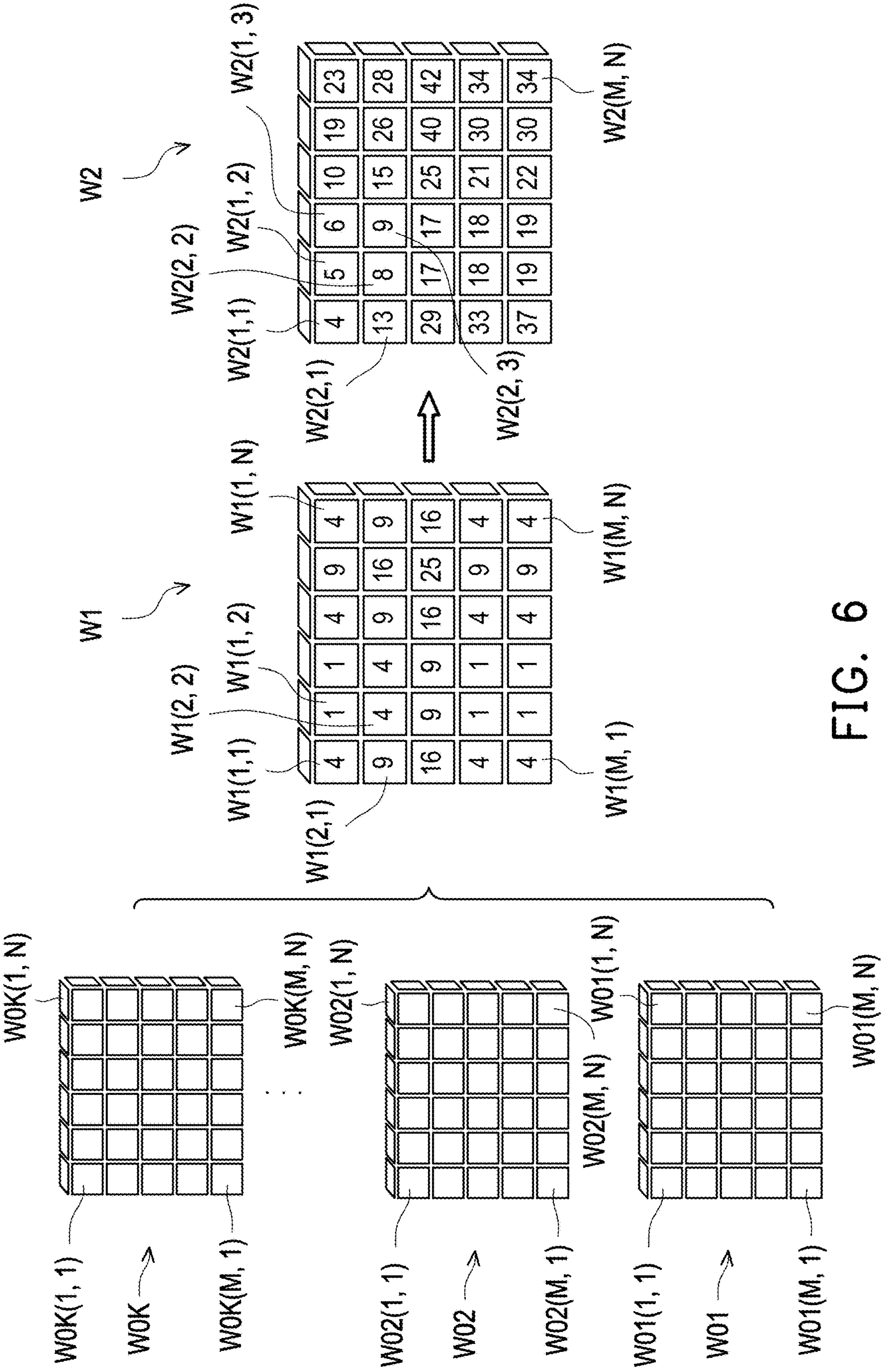
FIG. 6 is a schematic diagram of determining a two-dimensional data structure according to an embodiment of the disclosure.

Please refer to FIG. 6, which is a schematic diagram of determining a two-dimensional data structure according to an embodiment of the disclosure. In this embodiment, the reference data element corresponding to the m-th first image frame and the n-th second image frame in the reference two-dimensional data structure W01 is, for example, the reference data element located at (m, n), and the reference data element may be expressed as W01(m, n). For example, the reference data element W01(1, 1) is, for example, the reference data element corresponding to a 1-st first image frame and a 1-st second image frame in the reference two-dimensional data structure W01; the reference data element W01(1, N) is, for example, the reference data element corresponding to the 1-st first image frame and an N-th second image frame in the reference two-dimensional data structure W01; the reference data element W01(M, 1) is, for example, the reference data element corresponding to an M-th first image frame and the 1-st second image frame in the reference two-dimensional data structure W01; and the reference data element W01(M, N) is, for example, the reference data element corresponding to the M-th first image frame and the N-th second image frame in the reference two-dimensional data structure W01.

Similarly, the reference data element corresponding to the m-th first image frame and the n-th second image frame in the reference two-dimensional data structure W0K is, for example, the reference data element located at (m, n), and the reference data element may be expressed as W0K(m, n). For example, the reference data element W0K(1, 1) is, for example, the reference data element corresponding to a 1-st first image frame and a 1-st second image frame in the reference two-dimensional data structure W0K; the reference data element W0K(1, N) is, for example the reference data element corresponding to the 1-st first image frame and an N-th second image frame in the reference two-dimensional data structure W0K; the reference data element W0K (M, 1) is, for example, the reference data element corresponding to an M-th first image frame and the 1-st second image frame in the reference two-dimensional data structure W0K; and the reference data element W0K(M, N) is, for example, the reference data element corresponding to the M-th first image frame and the N-th second image frame in the reference two-dimensional data structure W0K.

In addition, the first data element corresponding to the m-th first image frame and the n-th second image frame in the first two-dimensional data structure W1 is, for example, the first data element located at (m, n), and the first data element may be expressed as W1(m, n). For example, the first data element W1(1, 1) is, for example, the first data element corresponding to a 1-st first image frame and a 1-st second image frame in the first two-dimensional data structure W1; the first data element W1(1, N) is, for example, the first data element corresponding to the 1-st first image frame and an N-th second image frame in the first two-dimensional data structure W1; the first data element W1(M, 1) is, for example, the first data element corresponding to an M-th first image frame and the 1-st second image frame in the first two-dimensional data structure W1; and the first data element W1(M, N) is, for example, the first data element corresponding to the M-th first image frame and the N-th second image frame in the first two-dimensional data structure W1.

Based on this, during the process of determining the first two-dimensional data structure W1, the processor 104 may respectively find the reference data elements W01(m, n) to W0K(m, n) in the reference two-dimensional data structures W01 to W0K, and determine the first data element W1(m, n) in the first two-dimensional data structure W1 accordingly.

In an embodiment, the processor 104 may, for example, determine the first data element W1(m, n) based on statistical characteristics (for example, a mean value) and/or a linear combination of the reference data elements W01(m, n) to W0K(m, n). In an embodiment, the processor 104 may first normalize the reference data elements W01(m, n) to W0K(m, n) and then take the statistical characteristics and/or the linear combination as the first data element W1(m, n), but not limited thereto.

For example, processor 104 may be configured to: determine the first data element W1(1, 1) (for example, 4 located at the upper left corner of the first two-dimensional data structure W1 in FIG. 6) based on the statistical characteristics and/or the linear combination of the reference data elements W01(1, 1) to W0K(1, 1); determine the first data element W1(M, 1) (for example, 4 located at the lower left corner of the first two-dimensional data structure W1 in FIG. 6) based on the statistical characteristics and/or the linear combination of the reference data elements W01(M, 1) to W0K(M, 1); determine the first data element W1(1, N) (for example, 4 located at the upper right corner of the first two-dimensional data structure W1 in FIG. 6) based on the statistical characteristics and/or the linear combination of the reference data elements W01(1, N) to W0K(1, N); and determine the first data element W1(M, N) (for example, 4 located at the lower right corner of the first two-dimensional data structure W1 in FIG. 6) based on the statistical characteristics and/or the linear combination of the reference data elements W01(M, N) to W0K(M, N).

For other first data elements in the first two-dimensional data structure W1, the processor 104 may determine based on similar principles, and the details will not be repeated here.

Next, in Step S430, the processor 104 finds a surrounding element corresponding to each first data element, and generates M×N second data elements accordingly, wherein the M×N second data elements form a second two-dimensional data structure M2.

During the process of executing Step S430, the processor 104 may first initialize the second two-dimensional data structure M2. For example, the processor 104 may first establish a data array with a dimension of M×N as the initialized second two-dimensional data structure M2. In this embodiment, the second data element corresponding to the m-th first image frame and the n-th second image frame is, for example, the second data element at the position (m, n) in the second two-dimensional data structure W2, and may be expressed as W2(m, n).

In an embodiment, when m and n are both 1, the processor 104 may determine that the second data element W2(m, n) is the first data element W1(m, n). That is, when determining the second data element W2(1, 1) located at the upper left corner of the second two-dimensional data structure W2, the processor 104 may directly use the first data element W1(1, 1) at the upper left corner of the first two-dimensional data structure W1 as the second data element W2(1, 1), but not limited thereto.

In addition, when m or n is not 1, the processor 104 may obtain the surrounding element corresponding to the first data element W1(m, n) in the second two-dimensional data structure W2, and add the first data element W1(m, n) and the corresponding surrounding element into the second data element W2(m, n).

In an embodiment, the surrounding element corresponding to the first data element W1(m, n) in the second two-dimensional data structure W2 includes at least one of the second data elements W2(m−1, n), W2(m, n−1), and W2(m−1, n−1). In addition, the surrounding element corresponding to the first data element W1(m, n) in the second two-dimensional data structure W2 may include the smallest of the second data elements W2(m−1, n), W2(m, n−1), and W2(m−1, n−1).

For example, when determining the second data element W2(1, 2), the processor 104 may find the surrounding element, such as the second data element W2(1, 1), corresponding to the first data element W1(1, 2) in the second two-dimensional data structure W2. Afterwards, the processor 104 may add the first data element W1(1, 2) and the second data element W2(1, 1) into the second data element W2(1, 2) (that is, 1+4=5).

For example, when determining the second data element W2(2, 1), the processor 104 may find the surrounding element, such as the second data element W2(1, 1), corresponding to the first data element W1(2, 1) in the second two-dimensional data structure W2. Afterwards, the processor 104 may add the first data element W1(2, 1) and the second data element W2(1, 1) into the second data element W2(2, 1) (that is, 9+4=13).

As another example, when determining the second data element W2(2, 2), the processor 104 may find the surrounding element, such as the smallest of the second data elements W2(1, 1), W2(1, 2), and W2(2, 1) (that is, 4 corresponding to the second data element W2(1, 1)), corresponding to the first data element W1(2, 2) in the second two-dimensional data structure W2. Afterwards, the processor 104 may add the first data element W1(2, 2) and the second data element W2(1, 1) into the second data element W2(2, 2) (that is, 4+4=8).

In short, when m or n is not 1, the processor 104 may select one (such as the smallest) of the second data elements W2(m−1, n), W2(m, n−1), and W2(m−1, n−1) to be added with the first data element W1(m, n) into the second data element W2(m, n). From another point of view, the processor 104 may also be understood as selecting one of the second data elements on the left, the upper left, and the top of the second data element W2(m, n) to be added with the first data element W1(m, n), so as to determine the second data element W2(m, n), but not limited thereto.

Based on the above mechanism, the processor 104 may correspondingly determine other second data elements in the second two-dimensional data structure W2, and the details thereof will not be repeated here.

Afterwards, in Step S440, the processor 104 determines the posture difference degree corresponding to the specific time interval T based on the second two-dimensional data structure W2

In an embodiment, the processor 104 may find the second data element corresponding to the M-th first image frame among the M first image frames and the N-th second image frame among the N second image frames in the M×N second data elements as a second specific data element (that is, a second data element W2(M, N)), and determine the second specific data element as the posture difference degree corresponding to the specific time interval T.

In FIG. 6, since the second data element W2(M, N) is 34, the processor 104 may determine that the posture difference degree corresponding to the specific time interval T is 34. However, the foregoing embodiment is only exemplary and is not intended to limit the possible implementations of the disclosure. In an embodiment of the disclosure, the posture difference degree represents the difference degree between the first user 311 and the second user 312 executing the specific action in the specific time interval T. The higher the posture difference degree, the less similar the actions of the first user 311 and the second user 312, and vice versa.

For other specific time intervals, the processor 104 may determine the corresponding posture difference degree based on the above mechanism. In this way, the first user 311 may know whether the action executed thereby is similar to that of the second user 312, thereby executing corresponding action correction.

However, for a user with less knowledge about the relevant exercise, only knowing whether the actions are similar may still not be enough to do the correct action. Based on this, an embodiment of the disclosure further provides a posture recommendation method, which may be used to provide relevant action correction recommendations to the user, and the relevant details are described as follows.

Figure 7:
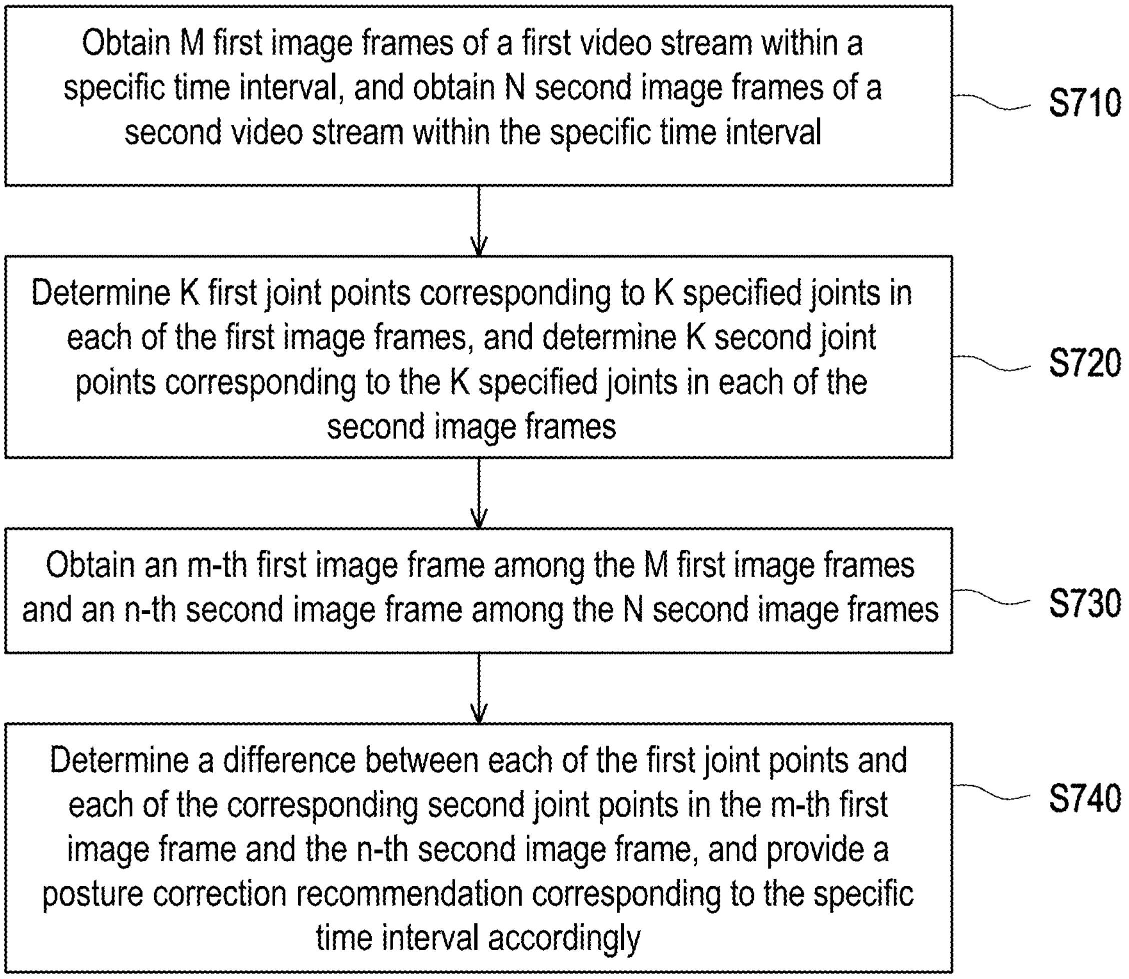
FIG. 7 is a flowchart of a posture recommendation method according to a second embodiment of the disclosure.

Please refer to FIG. 7, which is a flowchart of a posture recommendation method according to a second embodiment of the disclosure. The method of this embodiment may be executed by the electronic device 100 of FIG. 1, and the details of each step in FIG. 7 will be described below with the components shown in FIG. 1.

In Step S710, the processor 104 obtains the M first image frames of the first video stream within the specific time interval T, and obtains the N second image frames of the second video stream within the specific time interval T. In Step S720, the processor 104 determines the K first joint points corresponding to the K specified joints in each first image frame, and determines the K second joint points corresponding to the K specified joints in each second image frame. In Step S730, the processor 104 obtains the m-th first image frame among the M first image frames and the n-th second image frame among the N second image frames.

In the second embodiment, reference may be made to the relevant description of Steps S210 to S230 in FIG. 2 for the details of Steps S710 to S730, which will not be repeated here.

In Step S740, the processor 104 determines the difference between each first joint point and each corresponding second joint point in the m-th first image frame and the n-th second image frame, and accordingly provides a posture correction corresponding to a specific time interval T recommendation.

Figure 8:
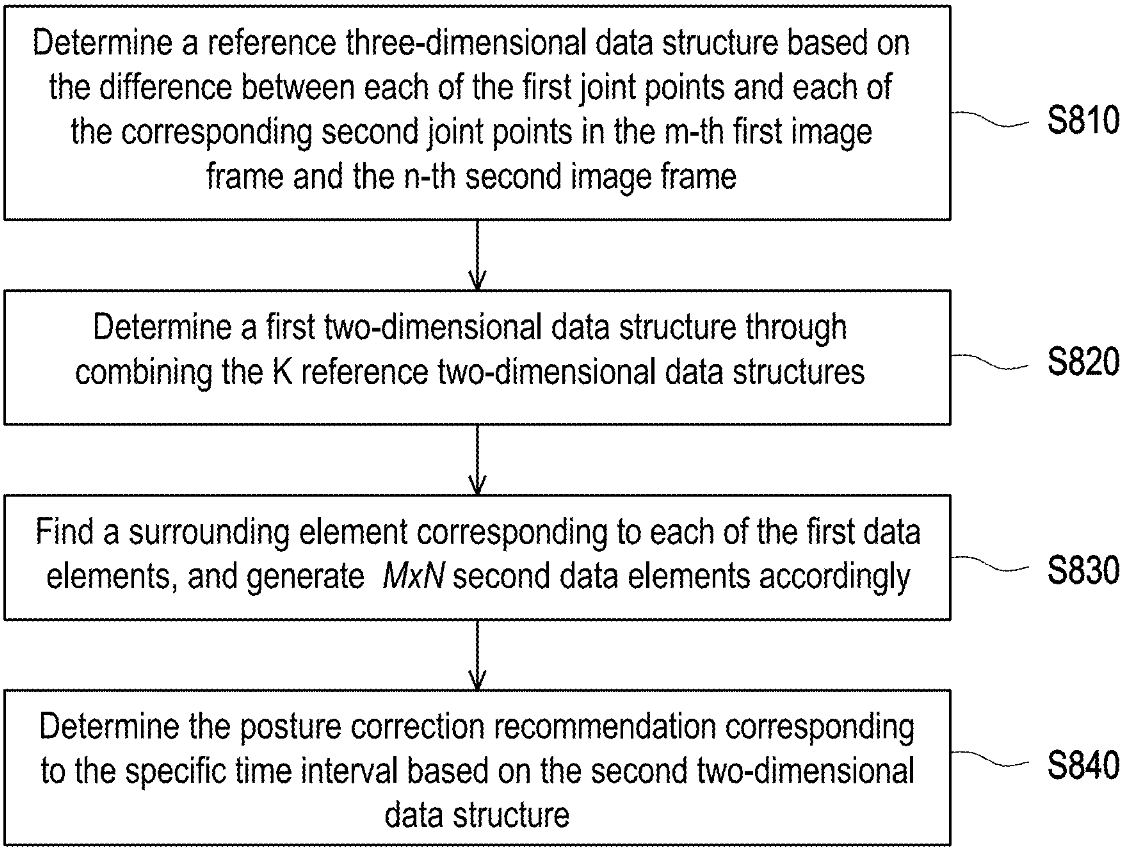
FIG. 8 is a flowchart of determining a posture correction recommendation corresponding to the specific time interval T according to the second embodiment of the disclosure.

In the second embodiment, the details of Step S740 will be explained with reference to FIG. 8, wherein FIG. 8 is a flowchart of determining a posture correction recommendation corresponding to the specific time interval T according to the second embodiment of the disclosure.

In Step S810, the processor 104 determines the reference three-dimensional data structure W0 based on the difference between each first joint point and each corresponding second joint point in the m-th first image frame and the n-th second image frame. In Step S820, the processor 104 determines the first two-dimensional data structure W1 through combining the K reference two-dimensional data structures W01 to W0K. In Step S830, the processor 104 finds the surrounding element corresponding to each first data element, and generates the M×N second data elements accordingly, wherein the M×N second data elements form the second two-dimensional data structure W2.

In the second embodiment, reference may be made to the relevant description of Steps S410 to S430 in FIG. 4 for the details of Steps S710 to S730, which will not be repeated here.

In Step S840, the processor 104 determines the posture correction recommendation corresponding to the specific time interval T based on the second two-dimensional data structure W2.

Figure 9:
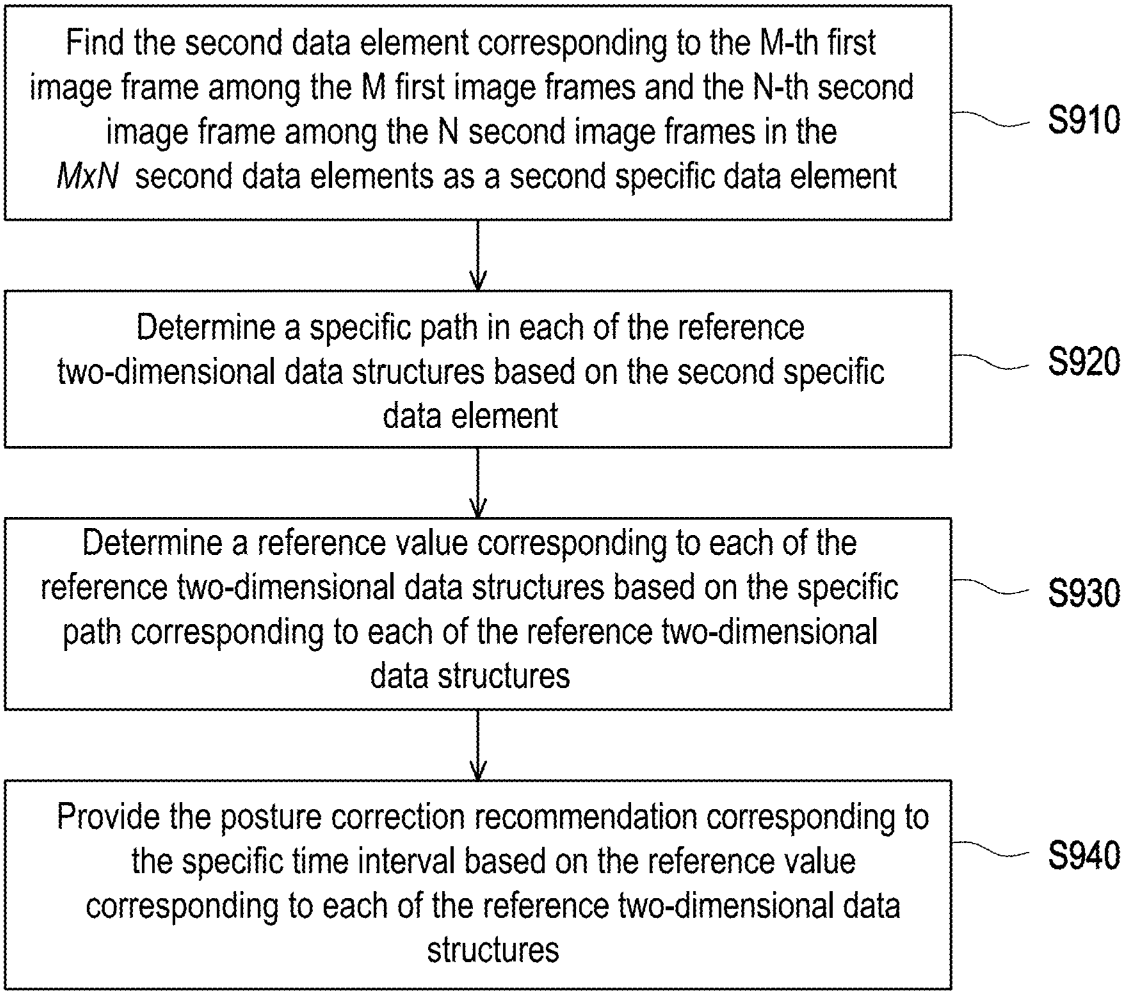
FIG. 9 is a flowchart of providing the posture correction recommendation corresponding to the specific time interval based on the second two-dimensional data structure according to the second embodiment of the disclosure.

In the second embodiment, the details of Step S840 will be illustrated with reference to FIG. 9, wherein FIG. 9 is a flowchart of providing the posture correction recommendation corresponding to the specific time interval based on the second two-dimensional data structure according to the second embodiment of the disclosure.

First, in Step S910, the processor 104 may find the second data element corresponding to the M-th first image frame among the M first image frames and the N-th second image frame among the N second image frames in the M×N second data elements as the second specific data element (that is, the second data element W2(M, N)).

In Step S920, the processor 104 may determine a specific path in each of the reference two-dimensional data structures W01 to W0K based on the second specific data element.

Figure 10:
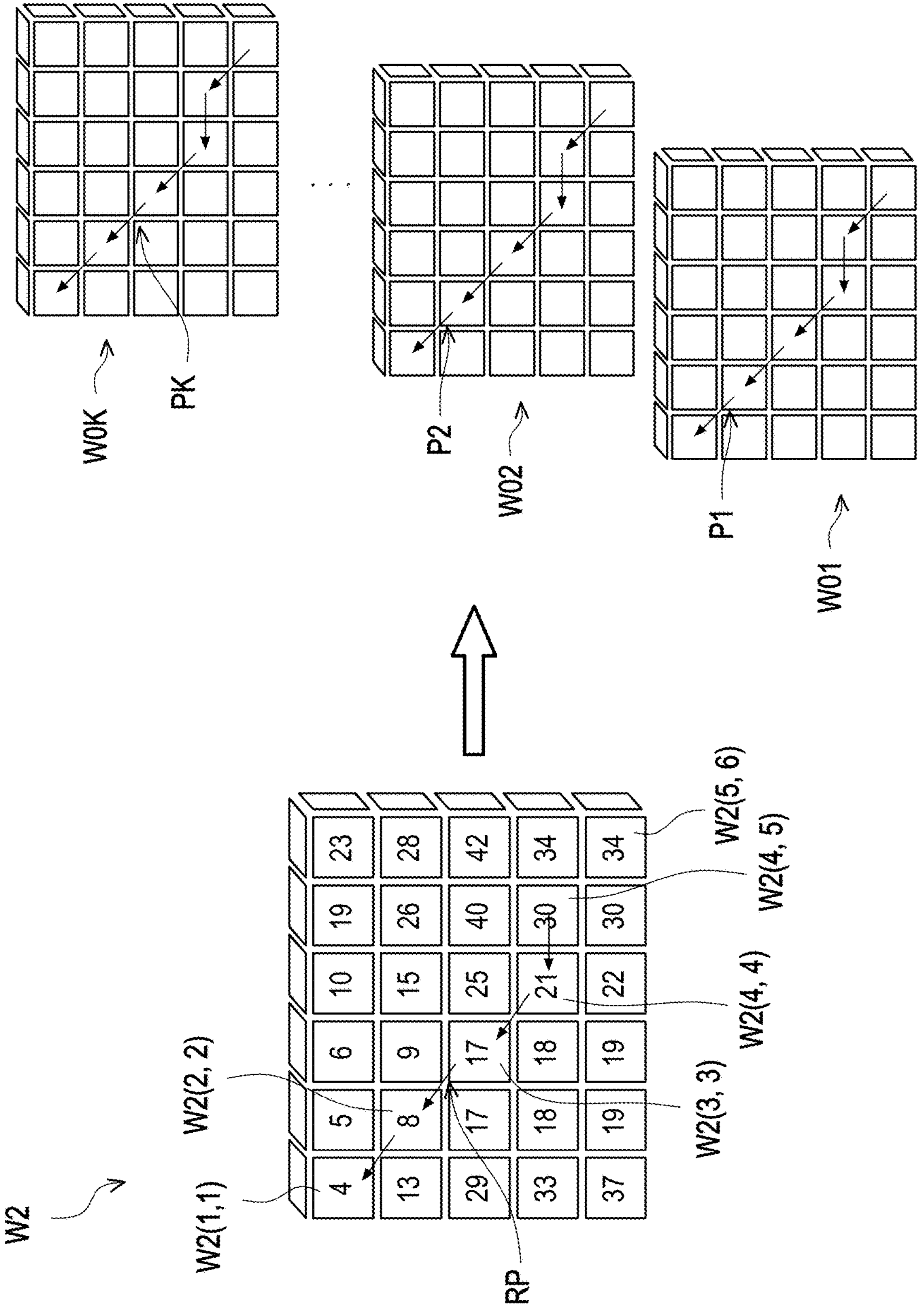
FIG. 10 is a schematic diagram of determining a specific path according to the second embodiment of the disclosure.

Please refer to FIG. 10, which is a schematic diagram of determining a specific path according to the second embodiment of the disclosure. In the scenario of FIG. 10, assuming that M and N are respectively 5 and 6, the processor 104 may find multiple third data elements involved in determining the second specific data element (that is, the second data element W2(5, 6)) in the second two-dimensional data structure W2.

In the scenario of FIG. 10, the determination process of the second data element W2(5, 6) (that is, the second specific data element) involves, for example, various operations in Table 1 below, wherein reference may be made to the relevant description of determining the second two-dimensional data structure W2 in FIG. 6 for the details of determining the second data element W2(5, 6).

TABLE 1

| Second data element | Value |
|---|---|
| W2(1, 1) = W1(1, 1) | 4 |
| W2(2, 2) = W1(2, 2) + W2(1, 1) | 8 |
| W2(3, 3) = W1(3, 3) + W2(2, 2) | 17 |
| W2(4, 4) = W1(4, 4) + W2(3, 3) | 21 |
| W2(4, 5) = W1(4, 6) + W2(4, 4) | 30 |
| W2(5, 6) = W1(5, 6) + W2(4, 5) | 34 |

In the scenario of FIG. 10, since the process of determining the second data element W2(5, 6) involves the second data elements W2(1, 1), W2(2, 2), W2(3, 3), W2(4, 4), and W2(4, 5), the processor 104 may determine the second data elements W2(1, 1), W2(2, 2), W2(3, 3), W2(4, 4), and W2(4, 5) as the third data elements, but not limited thereto.

Afterwards, the processor 104 may determine a reference path RP with multiple coordinates of the third data elements in the second two-dimensional data structure W2. In the scenario of FIG. 10, the coordinates of the third data elements in the second two-dimensional data structure W2 are, for example, respectively (1, 1), (2, 2), (3, 3), (4, 4), and (4, 5), and the processor 104 may determine the reference path RP accordingly.

Next, the processor 104 may find the path corresponding to the reference path RP in each of the reference two-dimensional data structures W01 to W0K as a corresponding specific path.

For example, in the reference two-dimensional data structure W01, the processor 104 may take the path corresponding to the reference path RP as a corresponding specific path P1 (which includes the coordinates (1, 1), (2, 2), (3, 3), (4, 4), and (4, 5)); in the reference two-dimensional data structure W02, the processor 104 may take the path corresponding to the reference path RP as a corresponding specific path P2 (which includes the coordinates (1, 1), (2, 2), (3, 3), (4, 4), and (4, 5)); and in the reference two-dimensional data structure W0K, the processor 104 may take the path corresponding to the reference path RP as a corresponding specific path PK (which includes the coordinates (1, 1), (2, 2), (3, 3), (4, 4), and (4, 5)).

Next, in Step S930, the process 104 may determine a reference value corresponding to each of the reference two-dimensional data structures W01 to W0K based on each of the specific paths P1 to PK corresponding to each of the reference two-dimensional data structures W01 to W0K.

In an embodiment, the processor 104 may find multiple specific data elements corresponding to a specific path in a k-th reference two-dimensional data structure among the reference two-dimensional data structures W01 to W0K, and add the specific data elements into the reference value corresponding to the k-th reference two-dimensional data structure.

For example, for the reference two-dimensional data structure W01 (that is, a 1-st reference two-dimensional data structure), the processor 104 may determine the reference data element located on the specific path P1 as the specific data element in the reference two-dimensional data structure W01. After that, the processor 104 may add the specific data elements in the reference two-dimensional data structure W01 into the reference value corresponding to the reference two-dimensional data structure W01.

As another example, for the reference two-dimensional data structure W02 (that is, a 2-nd reference two-dimensional data structure), the processor 104 may determine the reference data element located on the specific path P2 as the specific data element in the reference two-dimensional data structure W02. Afterwards, the processor 104 may add the specific data elements in the reference two-dimensional data structure W02 into the reference value corresponding to the reference two-dimensional data structure W02.

As another example, for the reference two-dimensional data structure W0K(that is, a K-th reference two-dimensional data structure), the processor 104 may determine the reference data element located on the specific path PK as the specific data element in the reference two-dimensional data structure W0K. After that, the processor 104 may add the specific data elements in the reference two-dimensional data structure W0K into the reference value corresponding to the reference two-dimensional data structure W0K.

For other reference two-dimensional data structures, the processor 104 may determine the corresponding reference value based on the above mechanism, and the details thereof will not be repeated here.

In some embodiments, the processor 104 may also normalize the reference values corresponding to the reference two-dimensional data structures W01 to W0K, but not limited thereto.

Afterwards, in Step S940, the processor 104 provides the posture correction recommendation corresponding to the specific time interval T based on the reference value corresponding to each of the reference two-dimensional data structures W01 to W0K.

In the second embodiment, the reference two-dimensional data structures W01 to W0K may be divided to respectively correspond to different parts of the body, such as head, torso, buttocks, arms, legs, upper body, and lower body. In an embodiment, the reference two-dimensional data structures W01 to W0K may be divided into a first group and a second group respectively corresponding to a first body part and a second body part. For ease of understanding, the following assumes that the first body part and the second body part are respectively the upper body and the lower body, but not limited thereto. In this case, one or more of the reference two-dimensional data structures W01 to W0K corresponding to the joints belonging to the upper body may be determined as belonging to the first group, and one or more of the reference two-dimensional data structures W01 to W0K corresponding to the joints belonging to the lower body may be determined as belonging to the second group.

In an embodiment, the processor 104 may be configured to: determine a first difference degree value (hereinafter referred to as V1) based on the (normalized) reference value corresponding to each reference two-dimensional data structure belonging to the first group; and determine a second difference degree value (hereinafter referred to as V2) based on the (normalized) reference value corresponding to each reference two-dimensional data structure belonging to the second group.

For ease of understanding, it is assumed below that K is 9, the reference two-dimensional data structures W01 to W06 belong to the first group, and the reference two-dimensional data structures W07 to W09 belong to the second group, but the same is only exemplary and is not intended to limit the possible implementations of the disclosure.

Based on this, the processor 104 may determine the first difference degree value V1 based on the reference value corresponding to each of the reference two-dimensional data structures W01 to W06 belonging to the first group, and determine the second difference degree value V2 based on the reference value corresponding to each of the reference two-dimensional data structures W07 to W09 belonging to the second group. In an embodiment, the processor 104 may, for example, use the statistical characteristics and/or the linear combination of the reference values corresponding to the reference two-dimensional data structures W01 to W06 as the first difference degree value V1, and use the statistical characteristics and/or the linear combination of the reference values corresponding to the reference two-dimensional data structures W07 to W09 as the second difference degree value V2, but not limited thereto.

Afterwards, the processor 104 may provide the posture correction recommendation corresponding to the specific time interval T based on a comparison result of the first difference degree value V1 and the second difference degree value V2.

In an embodiment, in response to determining that the first difference degree value V1 is greater than the second difference degree value V2, the processor 104 provides a first posture correction recommendation for correcting the first body part (for example, the upper body) as the posture correction recommendation. On the other hand, in response to determining that the first difference degree value V1 is not greater than the second difference degree value V2, the processor 104 may provide a second posture correction recommendation for correcting the second body part (for example, the lower body) as the posture correction recommendation.

In an embodiment, the processor 104 may also first determine the posture difference degree according to the content of the first embodiment, and determine whether the posture difference degree is lower than a difference degree threshold. In response to determining that the posture difference degree is lower than the difference degree threshold, it means that the first user 311 imitates the action of the second user 312 well. In this case, the processor 104 may provide a maintain posture recommendation as the posture correction recommendation or may not provide any recommendation.

On the other hand, in response to determining that the posture difference degree is not lower than the difference degree threshold, it means that the first user 311 does not properly imitate the action of the second user 312. In this case, the processor 104 may then provide the corresponding first posture correction recommendation and/or second posture correction recommendation as the posture correction recommendation according to the mechanism of the second embodiment, but not limited thereto.

In another embodiment, the reference two-dimensional data structures W01 to W0K may be divided into multiple different groups respectively corresponding to multiple different body parts. The processor 104 may respectively determine the posture difference degrees of the different groups, select the group corresponding to the largest difference degree value, and determine whether the posture difference degree is not lower than the difference degree threshold, thereby providing the corresponding posture correction recommendation for the body part corresponding to the group with the largest difference degree.

In yet another embodiment, in addition to providing the posture correction recommendations for different body parts, the processor 104 may also provide a quantified posture difference indicator or a posture difference interval according to the posture difference degree for the user to refer to the posture difference degree.

In summary, in the method according to the embodiments of the disclosure, the actions presented in different video streams may be compared and/or the posture correction recommendation may be provided, so that user may know whether a specific action is correctly executed when performing the specific action with reference to the video and know which specific body parts need to be adjusted. Thereby, learning actions through videos can be improved.

Finally, it should be noted that the above embodiments are only used to illustrate, but not to limit, the technical solutions of the disclosure. Although the disclosure has been described in detail with reference to the above embodiments, persons skilled in the art should understand that the technical solutions described in the above embodiments may still be modified or some or all of the technical features thereof may be equivalently replaced. However, the corrections or replacements do not cause the essence of the corresponding technical solutions to deviate from the scope of the technical solutions of the embodiments of the disclosure.

What is claimed is:

1. A posture comparison method, applied to an electronic device, comprising:

obtaining M first image frames of a first video stream within a specific time interval, and obtaining N second image frames of a second video stream within the specific time interval, where M and N are positive integers;

determining K first joint points corresponding to K specified body joints of a first user in each of the first image frames, and determining K second joint points corresponding to the K specified body joints of a second user in each of the second image frames, wherein the K first joint points respectively correspond to the K second joint points, and K is a positive integer;

obtaining an m-th first image frame among the M first image frames and an n-th second image frame among the N second image frames, wherein $1 \le m \le M$ and $1 \le n \le N$; and determining a difference between each of the first joint points and each of the corresponding second joint points in the m-th first image frame and the n-th second image frame, and determining a posture difference degree corresponding to the specific time interval accordingly;

wherein the step of determining the difference between each of the first joint points and each of the corresponding second joint points in the m-th first image frame and the n-th second image frame, and determining the posture difference degree corresponding to the specific time interval accordingly comprises:

determining a reference three-dimensional data structure based on the difference between each of the first joint points and each of the corresponding second joint points in the m-th first image frame and the n-th second image frame, wherein the reference three-dimensional data structure comprises K reference two-dimensional data structures, and the reference three-dimensional data structure has M×N×K reference data element;

determining a first two-dimensional data structure through combining the K reference two-dimensional data structures, wherein the first two-dimensional data structure has M×N first data elements; and determining the posture difference degree corresponding to the specific time interval based on the determining first data elements.

2. The posture comparison method according to claim 1, wherein the first video stream is a video of the first user executing a specific action, the second video stream is a video of the second user executing the specific action, and the posture difference degree represents a difference degree between the first user and the second user executing the specific action.

3. The posture comparison method according to claim 1, wherein the step of determining the first two-dimensional data structure through combining the K reference two-dimensional data structures comprises:

finding the reference data element corresponding to the m-th first image frame and the n-th second image frame in each of the reference two-dimensional data structures, and determining the first data element corresponding to the m-th first image frame and the n-th second image frame in the first two-dimensional data structure accordingly.

4. The posture comparison method according to claim 1, wherein the step of determining the posture difference degree corresponding to the specific time interval based on the M×N first data elements comprises:

finding a surrounding element corresponding to each of the first data elements, and generating M×N second data elements accordingly, wherein the M×N second data elements form a second two-dimensional data structure; and determining the posture difference degree corresponding to the specific time interval based on the second two-dimensional data structure.

5. The posture comparison method according to claim 4, wherein the first data element corresponding to the m-th first image frame and the n-th second image frame is expressed as W1(m, n), the second data element corresponding to the m-th first image frame and the n-th second image frame is expressed as W2(m, n), and the step of finding the surrounding element corresponding to each of the first data elements, and generating the M×N second data elements accordingly comprises:

initializing the second two-dimensional data structure;

determining that W2(m, n) is W1(m, n) when m and n are both 1;

obtaining the surrounding element corresponding to W1(m, n) in the second two-dimensional data structure, and adding W1(m, n) and the corresponding surrounding element into W2(m, n) when m or n is not 1.

6. The posture comparison method according to claim 5, wherein the surrounding element corresponding to W1(m, n) in the second two-dimensional data structure comprises at least one of W2(m−1, n), W2(m, n−1), and W2(m−1, n−1).

7. The posture comparison method according to claim 5, wherein the surrounding element corresponding to W1(m, n) obtained in the second two-dimensional data structure comprises a smallest one of W2(m−1, n), W2(m, n−1), and W2(m−1, n−1).

8. The posture comparison method according to claim 1, wherein the step of determining the reference three-dimensional data structure based on the difference between each of the first joint points and each of the corresponding second joint points in the m-th first image frame and the n-th second image frame comprises:

initializing the reference three-dimensional data structure;

obtaining a k-th first joint point among the K first joint points in the m-th first image frame as a first reference joint point, and obtaining a k-th second joint point among the K second joint points in the n-th second image frame as a second reference joint point, where $1 \le k \le K$;

determining a position difference between the first reference joint point and the second reference joint point, and setting a specific data element in the reference three-dimensional data structure accordingly, wherein the specific data element corresponds to the m-th first image frame, the n-th second image frame, and a k-th specified joint among the K specified joints.

9. The posture comparison method according to claim 8, wherein the step of determining the position difference between the first reference joint point and the second reference joint point comprises:

obtaining first pixel coordinates of the first reference joint point in the m-th first image frame;

obtaining second pixel coordinates of the second reference joint point in the n-th second image frame;

determining the position difference between the first reference joint point and the second reference joint point based on a distance between the first pixel coordinates and the second pixel coordinates.

10. The posture comparison method according to claim 4, wherein the step of determining the posture difference degree corresponding to the specific time interval based on the second two-dimensional data structure comprises:

finding the second data element corresponding to an M-th first image frame among the M first image frames and an N-th second image frame among the N second image frames in the M×N second data elements as a second specific data element;

determining the second specific data element as the posture difference degree corresponding to the specific time interval.

11. The posture comparison method according to claim 1, further comprising:

providing a posture correction recommendation corresponding to the specific time interval.

12. A non-transitory computer-readable storage medium, wherein the non-transitory computer-readable storage medium records an executable computer program, and the executable computer program is loaded by an electronic device to execute the posture comparison method according to claim 1.

13. An electronic device, comprising:

a non-transitory storage circuit, storing a program code; and a processor, coupled to the non-transitory storage circuit, accessing the program code, and configured to execute:

obtaining M first image frames of a first video stream within a specific time interval, and obtaining N second image frames of a second video stream within the specific time interval, where M and N are positive integers;

determining K first joint points corresponding to K specified body joints of a first user in each of the first image frames, and determining K second joint points corresponding to the K specified joints in each of the second image frames, wherein the K first joint points respectively correspond to the K second joint points, and K is a positive integer;

obtaining a m-th first image frame among the M first image frames and a n-th second image frame among the N second image frames, where 1≤m≤M and 1≤n≤N; and determining a difference between each of the first joint points and each of the corresponding second joint points in the m-th first image frame and the n-th second image frame, and determining a posture difference degree corresponding to the specific time interval accordingly;

wherein the step of determining the difference between each of the first joint points and each of the corresponding second joint points in the m-th first image frame and the n-th second image frame, and determining the posture difference degree corresponding to the specific time interval accordingly comprises:

determining a reference three-dimensional data structure based on the difference between each of the first joint points and each of the corresponding second joint points in the m-th first image frame and the n-th second image frame, wherein the reference three-dimensional data structure comprises K reference two-dimensional data structures, and the reference three-dimensional data structure has M×N×K reference data element;

determining a first two-dimensional data structure through combining the K reference two-dimensional data structures, wherein the first two-dimensional data structure has M×N first data elements; and determining the posture difference degree corresponding to the specific time interval based on the determining first data elements.

14. A posture recommendation method, applied to an electronic device, comprising:

obtaining M first image frames of a first video stream within a specific time interval, and obtaining N second image frames of a second video stream within the specific time interval, where M and N are positive integers;

determining K first joint points corresponding to K specified body joints of a first user in each of the first image frames, and determining K second joint points corresponding to the K specified body joints of a second user in each of the second image frames, wherein the K first joint points respectively correspond to the K second joint points, and K is a positive integer;

obtaining a m-th first image frame among the M first image frames and a n-th second image frame among the N second image frames, wherein 1≤m≤M and 1≤n≤N; and determining a difference between each of the first joint points and each of the corresponding second joint points in the m-th first image frame and the n-th second image frame, and providing a posture correction recommendation corresponding to the specific time interval accordingly;

wherein the step of determining the difference between each of the first joint points and each of the corresponding second joint points in the m-th first image frame and the n-th second image frame, and determining the posture difference degree corresponding to the specific time interval accordingly comprises:

determining a reference three-dimensional data structure based on the difference between each of the first joint points and each of the corresponding second joint points in the m-th first image frame and the n-th second image frame, wherein the reference three-dimensional data structure comprises K reference two-dimensional data structures, and the reference three-dimensional data structure has M×N×K reference data element;

determining a first two-dimensional data structure through combining the K reference two-dimensional data structures, wherein the first two-dimensional data structure has M×N first data elements; and determining the posture difference degree corresponding to the specific time interval based on the determining first data elements.

15. A non-transitory computer-readable storage medium, wherein the non-transitory computer-readable storage medium records an executable computer program, and the executable computer program is loaded by an electronic device to execute the posture recommendation method according to claim 14.

16. The electronic device according to claim 13, wherein determining the first two-dimensional data structure through combining the K reference two-dimensional data structures comprises:

finding the reference data element corresponding to the m-th first image frame and the n-th second image frame in each of the reference two-dimensional data structures, and determining the first data element corresponding to the m-th first image frame and the n-th second image frame in the first two-dimensional data structure accordingly.

17. The electronic device according to claim 13, wherein determining the posture difference degree corresponding to the specific time interval based on the M×N first data elements comprises:

finding a surrounding element corresponding to each of the first data elements, and generating M×N second data elements accordingly, wherein the M×N second data elements form a second two-dimensional data structure; and determining the posture difference degree corresponding to the specific time interval based on the second two-dimensional data structure.

18. The electronic device according to claim 17, wherein the first data element corresponding to the m-th first image frame and the n-th second image frame is expressed as W1(m, n), the second data element corresponding to the m-th first image frame and the n-th second image frame is expressed as W2(m, n), and the step of finding the surrounding element corresponding to each of the first data elements, and generating the M×N second data elements accordingly comprises:

initializing the second two-dimensional data structure;

determining that W2(m, n) is W1(m, n) when m and n are both 1;

obtaining the surrounding element corresponding to W1(m, n) in the second two-dimensional data structure, and adding W1(m, n) and the corresponding surrounding element into W2(m, n) when m or n is not 1.

19. The electronic device according to claim 18, wherein the surrounding element corresponding to W1(m, n) in the second two-dimensional data structure comprises at least one of W2(m−1, n), W2(m, n−1), and W2(m−1, n−1).

20. The electronic device according to claim 18, wherein the surrounding element corresponding to W1(m, n) obtained in the second two-dimensional data structure comprises a smallest one of W2(m−1, n), W2(m, n−1), and W2(m−1, n−1).

* * * * *